United States Patent [19]
Halila

[11] Patent Number: 5,285,632
[45] Date of Patent: Feb. 15, 1994

[54] LOW $NO_x$ COMBUSTOR

[75] Inventor: Ely E. Halila, Cincinnati, Ohio

[73] Assignee: General Electric Company, Cincinnati, Ohio

[21] Appl. No.: 14,887

[22] Filed: Feb. 8, 1993

[51] Int. Cl.$^5$ .............................. F02C 7/20; F02G 3/00
[52] U.S. Cl. ................................. 60/39.31; 60/39.32; 60/747; 60/752; 60/753
[58] Field of Search .................... 60/39.31, 39.32, 747, 60/752, 753

[56] References Cited

U.S. PATENT DOCUMENTS

| | | | |
|---|---|---|---|
| Re. 30,160 | 11/1979 | Emory, Jr. et al. | 60/752 |
| 3,032,990 | 5/1962 | Rogers | 60/39.31 |
| 3,972,182 | 8/1976 | Salvi | 60/39.32 |
| 4,173,118 | 11/1979 | Kawaguchi | 60/39.65 |
| 4,194,358 | 3/1980 | Stenger | 60/39.06 |
| 4,322,945 | 4/1982 | Peterson et al. | 60/39.32 |
| 4,374,466 | 2/1983 | Sotheran | 60/39.36 |
| 4,555,901 | 12/1985 | Wakeman et al. | 60/752 |
| 4,567,730 | 2/1986 | Scott | 60/39.32 |
| 4,773,227 | 9/1988 | Chabis | 60/39.32 |
| 4,914,918 | 4/1990 | Sullivan | 60/39.32 |
| 4,999,996 | 3/1991 | Duchene et al. | 60/752 |
| 5,197,278 | 3/1993 | Sabla et al. | 60/747 |

OTHER PUBLICATIONS

Jones, "Advanced Technology for Reducing Aircraft Engine Pollution," Nov. 1974, Transactions of the ASME, Serie B: Journal of Engineering for Industry, pp. 1354-1360.

Primary Examiner—Richard A. Bertsch
Assistant Examiner—Howard R. Richman
Attorney, Agent, or Firm—Jerome C. Squillaro

[57] ABSTRACT

A combustor includes a dome assembly having radially outer and inner liners joined thereto and defining therebetween a combustion zone. The dome assembly includes at least one annular dome having a pair of axially extending first flanges between which are disposed a plurality of circumferentially spaced apart carburetors for discharging a fuel/air mixture into the combustion zone for generating combustion gases. An annular heat shield includes a pair of axially extending legs integrally joined to a radially extending face in a generally U-shaped configuration, with the face including a plurality of circumferentially spaced apart ports disposed concentrically with perspective ones of the carburetors for allowing the fuel/air mixture to be discharged therefrom through the heat shield. At least one of the heat shield legs includes a plurality of circumferentially spaced apart mounting holes disposed adjacent to a respective one of the dome flanges, and a plurality of mounting pins are fixedly joined to the dome flange and extend radially through respective ones of the mounting holes without interference therewith for allowing unrestrained thermal movement between the heat shield and the dome while supporting the heat shield against axial pressure loads thereon. In a preferred embodiment, the dome assembly includes three domes having respective ones of the heat shield, and respective baffles are spaced from the heat shields for providing impingement cooling thereof.

13 Claims, 5 Drawing Sheets

LOW NO$_x$ COMBUSTOR

The invention herein described was made in the performance of work under a NASA contract and is subject to the provisions of Section 305 of the National Aeronautics and Space Act of 1958, Public Law 85-568 (72 Stat. 435;42 USC 2457).

The present invention relates generally to gas turbine engines, and, more specifically, to a low NO$_x$ combustor therein.

CROSS REFERENCE TO RELATED APPLICATION

The present invention is related to concurrently filed patent applications Ser. No. 08/014,949, entitled "Segmented Combustor," Ser. No. 08/014,886, entitled "Combustor Liner Support Assembly," and Ser. No. 08/014,923, entitled "Liner Mounting Assembly," all by the same inventor and assignee.

BACKGROUND OF THE INVENTION

In a gas turbine engine, a fuel and air mixture is ignited for generating combustion gases from which energy is extracted for producing power, such as thrust for powering an aircraft in flight. In one aircraft designated High Speed Civil Transport (HSCT), the engine is being designed for powering the aircraft at high Mach speeds and high altitude conditions. And, reduction of exhaust emissions from the combustion gases is a primary objective for this engine.

More specifically, conventionally known oxides of nitrogen, i.e. NO$_x$, are environmentally undesirable and the reduction thereof from aircraft gas turbine engines is desired. It is known that NO$_x$ emissions increase when cooling air is injected into the combustion gases during operation. However, it is difficult to reduce the amount of cooling air used in a combustor since the combustor itself is typically made of metals requiring suitable cooling in order to withstand the high temperatures of the combustion gases.

In a typical gas turbine engine, a compressor provides compressed air which is mixed with fuel in the combustor and ignited for generating combustion gases which are discharged into a conventional turbine which extracts energy therefrom for powering, among other things, the compressor. In order to cool the combustor, a portion of the air compressed in the compressor is bled therefrom and suitably channeled to the various parts of the combustor for providing various types of cooling thereof including conventional film cooling and impingement cooling. However, any air bled from the compressor which is not used in the combustion process itself decreases the overall efficiency of the engine, but, nevertheless, is typically required in order to suitably cool the combustor for obtaining a useful life thereof.

One conventionally known, advanced combustor design utilizes non-metallic combustor liners which have a higher heat temperature capability than the conventional metals typically utilized in a combustor. Non-metallic combustor liners may be conventionally made from conventional Ceramic Matrix Composite (CMC) materials such as that designated Nicalon/Silicon Carbide (SiC) available from Dupont SEP; and conventional carbon/carbon (C/C) which are carbon fibers in a carbon matrix being developed for use in high temperature gas turbine environments. However, these non-metallic materials typically have thermal coefficients of expansion which are substantially less than the thermal coefficients of expansion of conventional superalloy metals typically used in a combustor from which such non-metallic liners must be supported.

Accordingly, during the thermal cycle operation inherent in a gas turbine engine, the various components of the combustor expand and contract in response to heating by the combustion gases, which expansion and contraction must be suitably accommodated without interference in order to avoid unacceptable thermally induced radial interference loads between the combustor components which might damage the components or result in an unacceptably short useful life thereof. Since the non-metallic materials are also typically relatively brittle compared to conventional combustor metallic materials, they have little or no ability to deform without breakage. Accordingly, special arrangements must be developed for suitably mounting non-metallic materials in a conventional combustor in order to prevent damage thereto from radial interference during thermal cycles and for obtaining a useful life thereof.

Since non-metallic materials being considered for use in a combustor have higher temperature capability than conventional combustor metals, they may be substantially imperforate without using typical film cooling holes therethrough, which therefore reduces the need for bleeding compressor cooling air, with the eliminated film cooling air then reducing NO$_x$ emissions since such air is no longer injected into the combustion gases downstream from the introduction of the original fuel/air mixture. However, it is nevertheless desirable to cool the back sides of the non-metallic materials in the combustor, with a need, therefore, for discharging the spent cooling air into the flowpath without increasing NO$_x$ emissions from the combustion gases.

Furthermore, the various components of a conventional combustor must also typically withstand differential axial pressures thereon, and vibratory response without adversely affecting the useful life of the components. This provides additional problems in mounting non-metallic materials in the combustor since such mounting must also accommodate pressure loads and vibration of the components in addition to accommodating thermal expansion and contraction thereof.

SUMMARY OF THE INVENTION

A combustor includes a dome assembly having radially outer and inner liners joined thereto and defining therebetween a combustion zone. The dome assembly includes at least one annular dome having a pair of axially extending first flanges between which are disposed a plurality of circumferentially spaced apart carburetors for discharging a fuel/air mixture into the combustion zone for generating combustion gases. An annular heat shield includes a pair of axially extending legs integrally joined to a radially extending face in a generally U-shaped configuration, with the face including a plurality of circumferentially spaced apart ports disposed concentrically with perspective ones of the carburetors for allowing the fuel/air mixture to be discharged therefrom through the heat shield. At least one of the heat shield legs includes a plurality of circumferentially spaced apart mounting holes disposed adjacent to a respective one of the dome flanges, and a plurality of mounting pins are fixedly joined to the dome flange and extend radially through respective ones of the mounting holes without interference therewith for allowing unrestrained thermal movement between the heat shield and the dome while supporting the heat shield against axial pressure loads thereon. In a preferred embodiment, the dome assembly includes three domes having respective ones of the heat shield, and respective baffles are spaced from the heat shields for providing impingement cooling thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
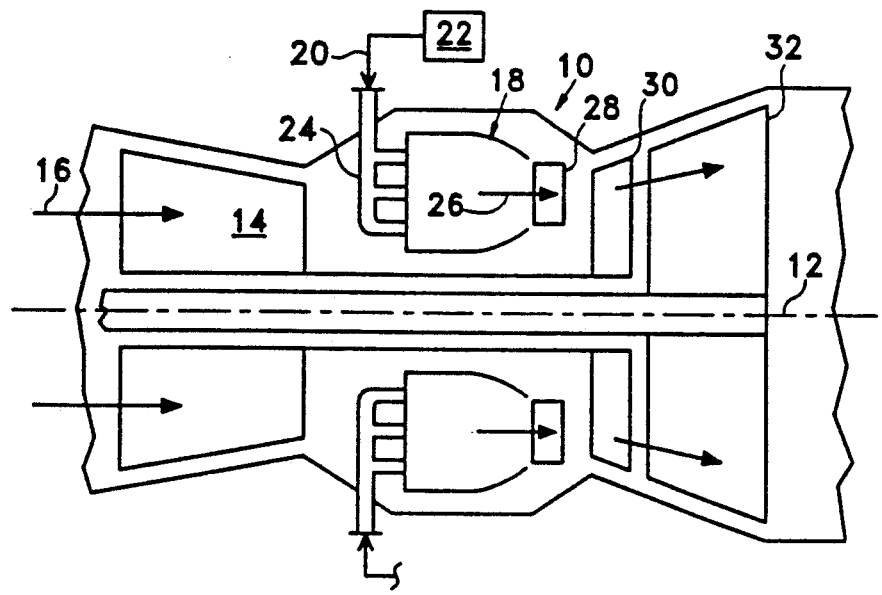
FIG. 1 is a schematic, longitudinal sectional view of a portion of a gas turbine engine including an annular combustor in accordance with one embodiment of the present invention.

Illustrated schematically in FIG. 1 is a portion of an exemplary gas turbine engine 10 having a longitudinal or axial centerline axis 12. The engine 10 is configured for powering a High Speed Civil Transport (HSCT) at high Mach numbers and at high altitude with reduced oxides of nitrogen (NO$_x$) in accordance with one objective of the present invention. The engine 10 includes, inter alia, a conventional compressor 14 which receives air 16 which is compressed therein and conventionally channeled to a combustor 18 effective for reducing NO$_x$ emissions. The combustor 18 is an annular structure disposed coaxially about the centerline axis 12 and is conventionally provided with fuel 20 from a conventional means 22 for supplying fuel which channels the fuel 20 to a plurality of circumferentially spaced apart fuel injectors 24 which inject the fuel 20 into the combustor 18 wherein it is mixed with the compressed air 16 and conventionally ignited for generating combustion gases 26 which are discharged axially downstream from the combustor 18 into a conventional high pressure turbine nozzle 28, and, in turn, into a conventional high pressure turbine (HPT) 30. The HPT 30 is conventionally joined to the compressor 14 through a conventional shaft, with the HPT 30 extracting energy from the combustion gases 26 for powering the compressor 14. A conventional power or low pressure turbine (LPT) 32 is disposed axially downstream from the HPT 30 for receiving therefrom the combustion gases 26 from which additional energy is extracted for providing output power from the engine 10 in a conventionally known manner.

Figure 2:
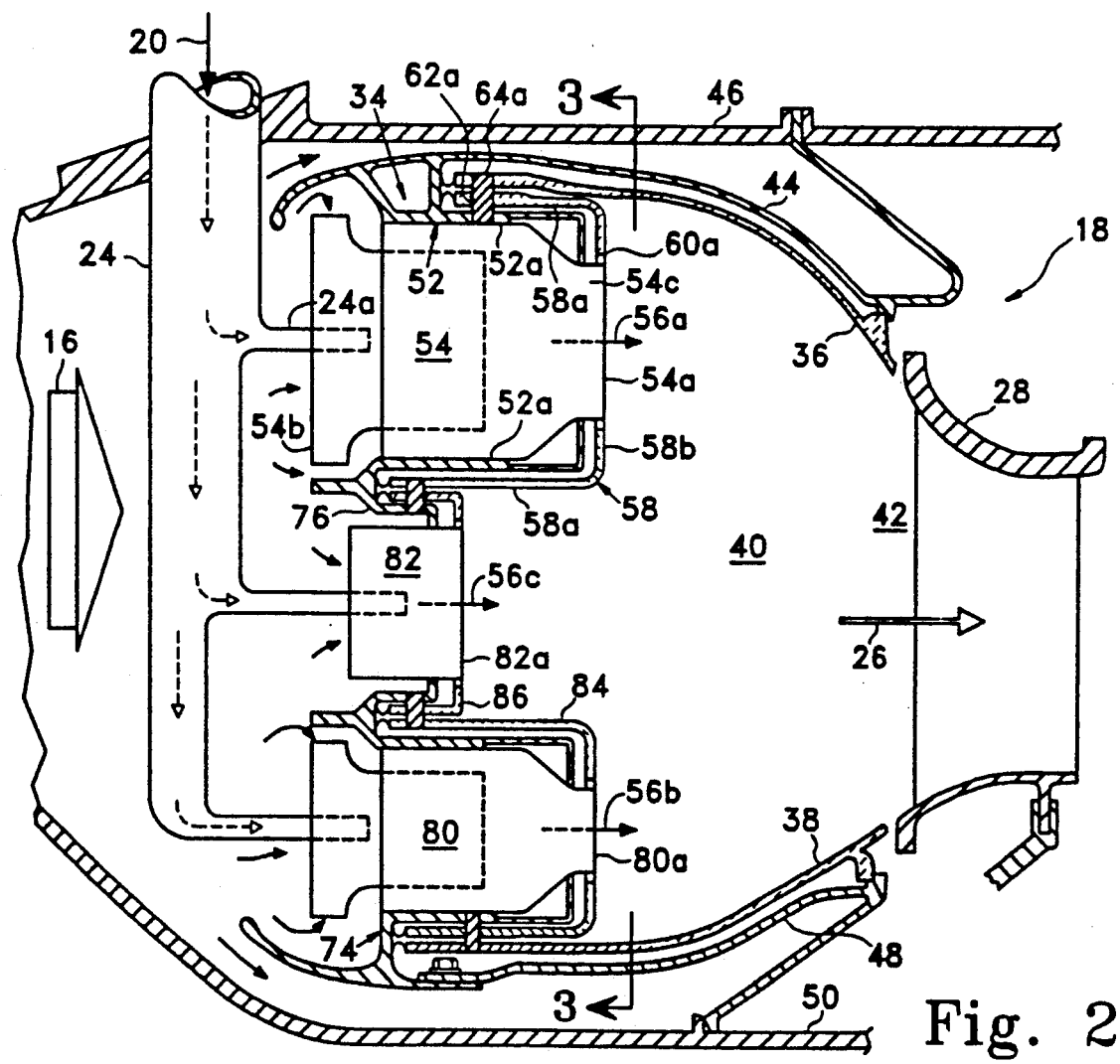
FIG. 2 is an enlarged schematic view of the top portion of the combustor shown in FIG. 1 illustrating an exemplary triple dome assembly including heat shields in accordance with one embodiment of the present invention.

Illustrated in more detail in FIG. 2 is the upper portion of the combustor 18 of FIG. 1 which includes at its upstream end an annular structural dome assembly 34 to which are joined an annular radially outer liner 36 and an annular radially inner liner 38. The inner liner 38 is spaced radially inwardly from the outer liner 36 to define therebetween an annular combustion zone 40, with downstream ends of the outer and inner liners 36, 38 defining therebetween a combustor outlet 42 for discharging the combustion gases 26 therefrom and into the nozzle 28. In the exemplary embodiment illustrated in FIG. 2, the dome assembly 34 includes a radially outer, annular supporting frame 44 conventionally joined to an annular outer casing 46, and a radially inner, annular supporting frame 48 conventionally fixedly joined to an annular, radially inner casing 50. The dome assembly 34 may be otherwise conventionally supported to the outer and inner casings 46, 50 as desired.

In the exemplary embodiment illustrated in FIG. 2, the dome assembly 34 and the outer and inner frames 44, 48 are made from conventional metallic combustor materials typically referred to as superalloys. Such superalloys have relatively high temperature capability to withstand the hot combustion gases 26 and the various pressure loads, including axial loads, which are carried thereby due to the high pressure air 16 from the compressor 14 acting on the dome assembly 34, and on the liners 36, 38.

In a conventional combustor, conventional metallic combustion liners would extend downstream from the dome assembly 34, with each liner including a plurality of conventional film cooling apertures therethrough which are supplied with a portion of the compressed air 16 for cooling the liners, with the spent film cooling air then being discharged into the combustion zone 40 wherein it mixes with the combustion gases 26 prior to discharge from the combustor outlet 42. An additional portion of the cooling air 16 is also conventionally used for cooling the dome assembly 34 itself, with the spent cooling air also being discharged into the combustion gases 26 prior to discharge from the outlet 42. Bleeding a portion of the compressed air 16 from the compressor 14 (see FIG. 1) for use in cooling the various components of a combustor necessarily reduces the available air which is mixed with the fuel 20 and undergoes combustion in the combustion zone 40 which, in turn, decreases the overall efficiency of the engine 10. Furthermore, any spent cooling air 16 which is reintroduced into the combustion zone 40 and mixes with the combustion gases 26 therein prior to discharge from the outlet 42 typically increases nitrogen oxide (NO$_x$) emissions from the combustor 18 as is conventionally known.

For the HSCT application described above, it is desirable to reduce the amount of the air 16 bled from the compressor 14 for cooling purposes, and to also reduce the amount of spent cooling air injected into the combustion gases 26 prior to discharge from the combustor outlet 42 for significantly reducing NO$_x$ emissions over a conventionally cooled combustor.

In accordance with one object of the present invention, the outer and inner liners 36, 38 are preferably non-metallic material effective for withstanding heat from the combustion gases 26 and are also preferably substantially imperforate and characterized by the absence of film cooling apertures therein for eliminating the injection of spent film cooling air into the combustion gases 26 prior to discharge from the outlet 42 for reducing $NO_x$ emissions and also allowing higher temperature combustion within the combustion zone 40. Conventional non-metallic combustor liner materials are known and include conventional Ceramic Matrix Composites (CMC) materials and carbon/carbon (C/C) as described above. These non-metallic materials have high temperature capability for use in a gas turbine engine combustor, but typically have low ductility and, therefore, require suitable support in the combustor 18 for accommodating pressure loads, vibratory response, and differential thermal expansion and contraction relative to the metallic dome assembly 34 for reducing stresses therein and for obtaining a useful effective life thereof.

Since conventional non-metallic combustor materials have a coefficient of thermal expansion which is substantially less than the coefficient of thermal expansion of metallic combustor materials such as those forming the dome assembly 34, the liners 36, 38 must be suitably joined to the dome assembly 34, for example, for allowing unrestricted or unrestrained thermal expansion and contraction movement relative to the dome assembly 34 to prevent or reduce thermally induced loads therefrom.

Furthermore, the metallic dome assembly 34 itself must also be suitably protected from the increased high temperature combustion gases 26 within the combustion zone 40 which are realizable due to the use of the non-metallic liners 36, 38.

In accordance with one embodiment of the present invention illustrated in FIG. 2, the dome assembly 34 includes at least one or a first annular dome 52 having a pair of axially extending and radially spaced apart first flanges 52a between which are suitably fixedly joined to the first dome 52 a plurality of circumferentially spaced apart first carburetors 54 which are effective for discharging from respective first outlets 54a thereof a first fuel/air mixture 56a. In the preferred embodiment illustrated in FIG. 2, the dome assembly 34 is a triple dome assembly as described in further detail hereinbelow but may include one or more domes in accordance with the present invention.

Figure 3:
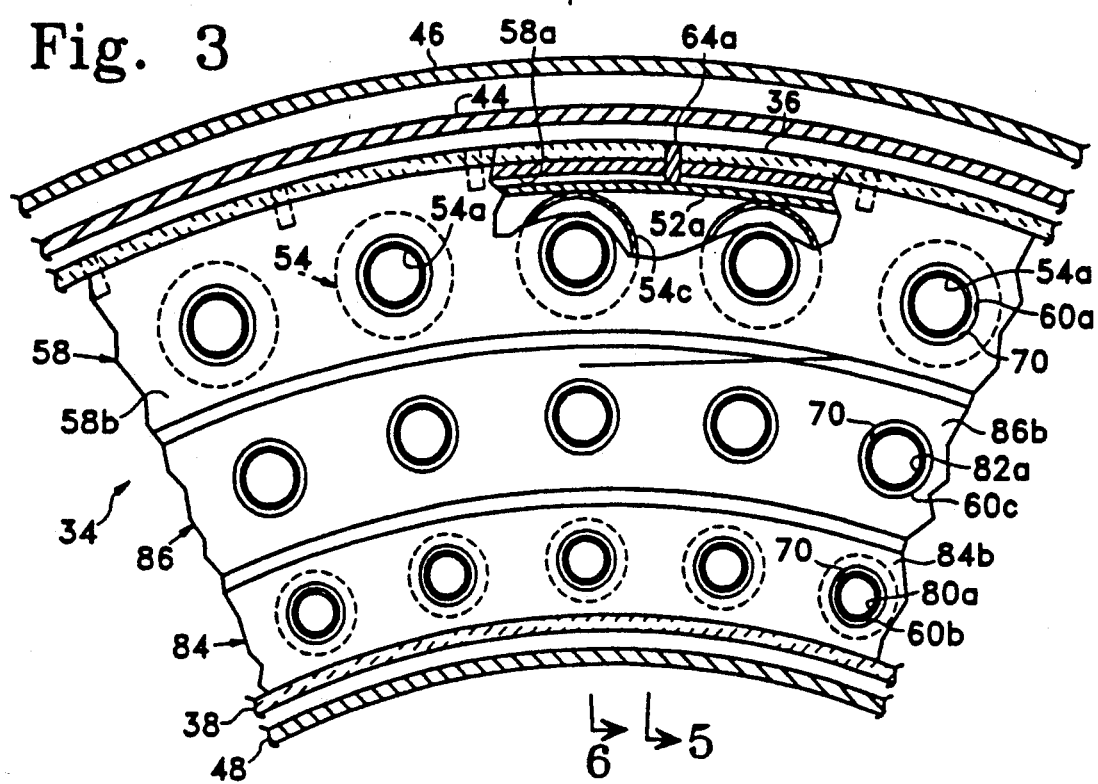
FIG. 3 is an upstream facing, partly sectional view of the combustor illustrated in FIG. 2 taken generally along line 3—3.

Each of the first carburetors 54 includes a conventional air swirler 54b which receives a portion of the fuel 20 from a first tip 24a of the fuel injector 24 for mixing with a portion of the compressed air 16 and discharged through a tubular mixing can or mixer 54c, with the resulting first fuel/air mixture 56a being discharged from the first outlet 54a into the combustion zone 40 wherein it is conventionally ignited for generating the combustion gases 26. Referring also to FIG. 3, several of the circumferentially spaced apart first carburetors 54 including their outlets 54a are illustrated in more particularity.

Figure 4:
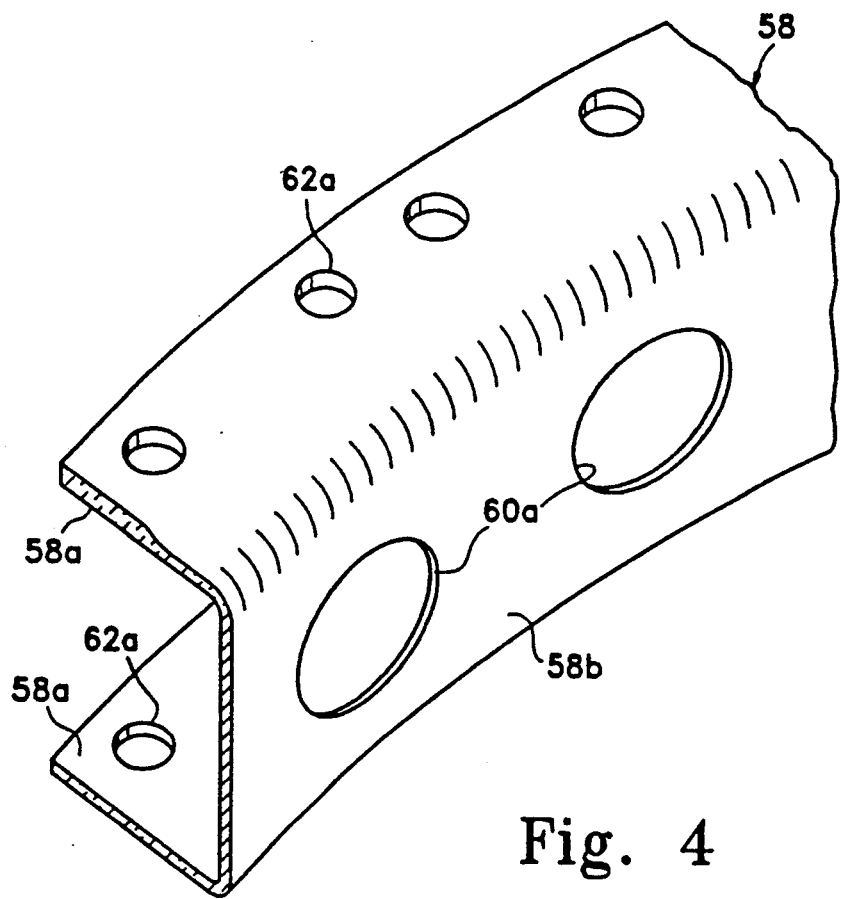
FIG. 4 is a perspective view of a portion of an exemplary one of the heat shields used in the combustor illustrated in FIG. 2.

In order to protect the metallic first dome 52 and the first carburetors 54 from the high temperature combustion gases 26, an annular first heat shield 58 mounted in accordance with the present invention is provided and includes a pair of radially spaced apart and axially extending first legs 58a, better shown in FIG. 4, which are integrally joined to a radially extending first base or face 58b in a generally U-shaped configuration, with the first face 58b facing in a downstream, aft direction toward the combustion zone 40. The first face 58b includes a plurality of circumferentially spaced apart first access ports 60a disposed concentrically with respective ones of the first outlets 54a for allowing the first fuel/air mixture 56a to be discharged from the first carburetors 54 axially through the first heat shield 58. And, at least one, and preferably both, of the first legs 58a includes a plurality of circumferentially spaced apart and radially extending first mounting holes 62a, as best shown in FIG. 4, disposed adjacent to a respective mounting one, and in a preferred embodiment both, of the first flanges 52a.

As shown in FIG. 2, the top leg 58a is disposed radially above the top first flange 52a and predeterminedly spaced therefrom, and the bottom leg 58a is disposed radially below the bottom first flange 52a and suitably spaced therefrom. In order to mount the first heat shield 58 to the dome assembly 34, a plurality of circumferentially spaced apart first mounting pins 64a are suitably fixedly joined to at least one of the first flanges 52a and extend radially through respective ones of the first mounting holes 62a without interference or restraint therewith for allowing unrestrained differential thermal growth and contraction movement between the first heat shield 58 and the first dome 52 while supporting the first heat shield 58 against axial pressure loads thereon.

The outer diameter of the first mounting pin 64a is suitably less than the inner diameter of the first mounting hole 62a, subject to conventional manufacturing tolerances, for allowing free radial movement of the first mounting pin 64a through the first mounting hole 62a subject solely to any friction therebetween where one or more portions of the first mounting pins 64a slide against the first mounting holes 62a. As best shown in FIG. 2, the first dome 52 is, therefore, allowed to expand radially outwardly at a greater growth than the radially outwardly expansion of the annular first heat shield 58, with the first mounting pins 64a sliding radially outwardly through the respective first mounting holes 62a. In this way, differential thermal movement between the first heat shield 58 and the first dome 52 is accommodated for preventing undesirable thermal stresses in the first heat shield 58 which could lead to its thermal distortion and damage thereof. However, the first mounting pin 64a nevertheless supports the first heat shield 58 to the first dome 52 against pressure forces acting on the first heat shield 58 as well as vibratory movement thereof. For example, axial pressure forces across the first face 58b are reacted at least in part through the first mounting pins 64a and transferred into the first dome 52 and in turn into the outer and inner frames 44, 48.

Since the first heat shield 58 is also preferably a non-metallic material formed, for example, from a ceramic matrix composite, it is preferably imperforate between the first mounting holes 62a and the first ports 60a as best shown in FIG. 4. Accordingly, no film cooling holes are provided in the first heat shield 58 and, therefore, no spent film cooling air is injected into the combustion gases 26 which would lead to an increase in $NO_x$ emissions. However, a portion of the compressed air 16 may be suitably channeled against the back sides of the outer and inner liners 36, 38 as well as against the back side of the first heat shield 58 for providing cooling thereof, and then suitably reintroduced into the flowpath without increasing $NO_x$ emissions.

Figure 5:
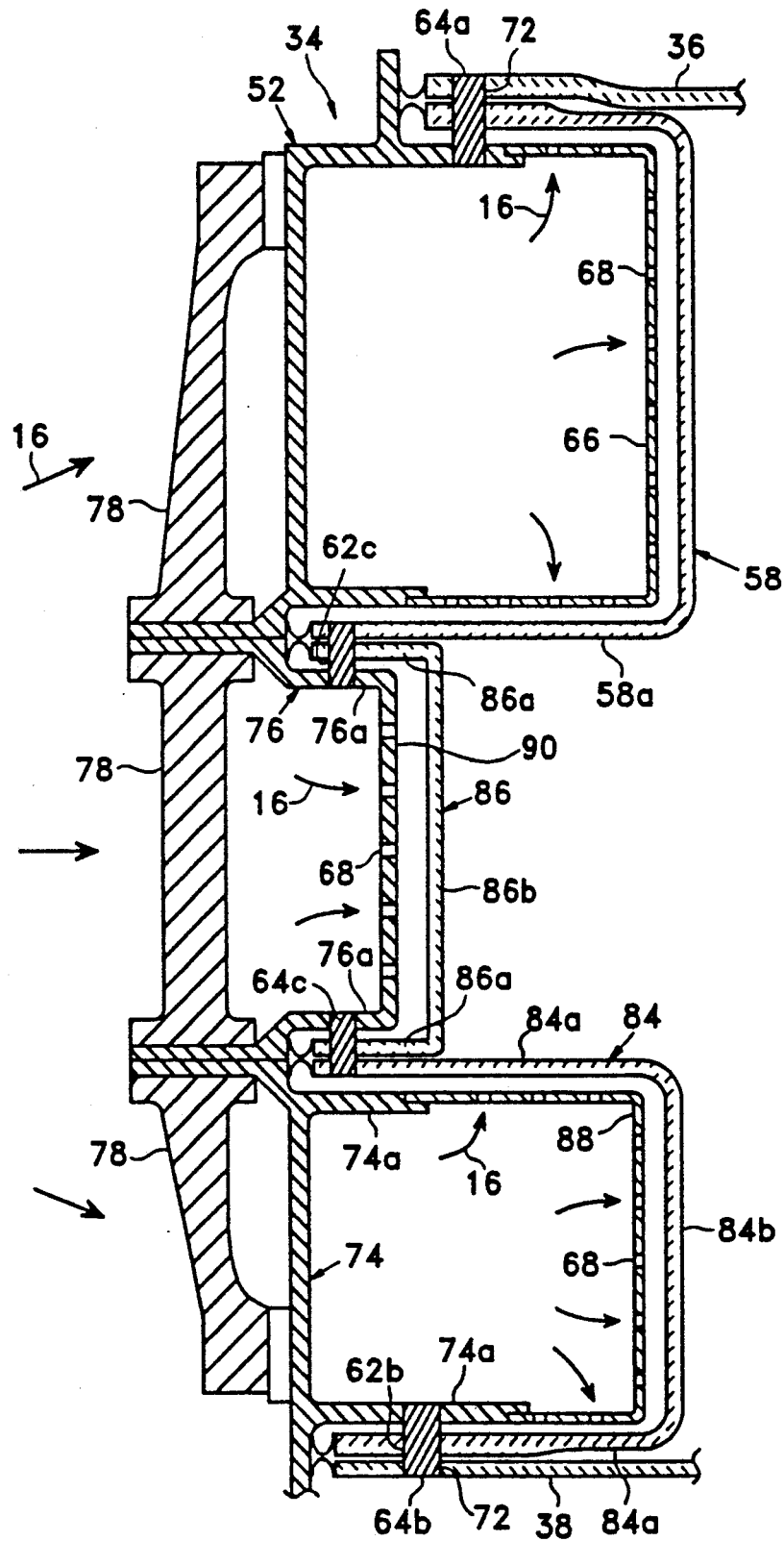
FIG. 5 is a sectional view of the dome portion of the combustor illustrated in FIG. 3 taken circumferentially between adjacent carburetors therein along line 5—5.
Figure 6:
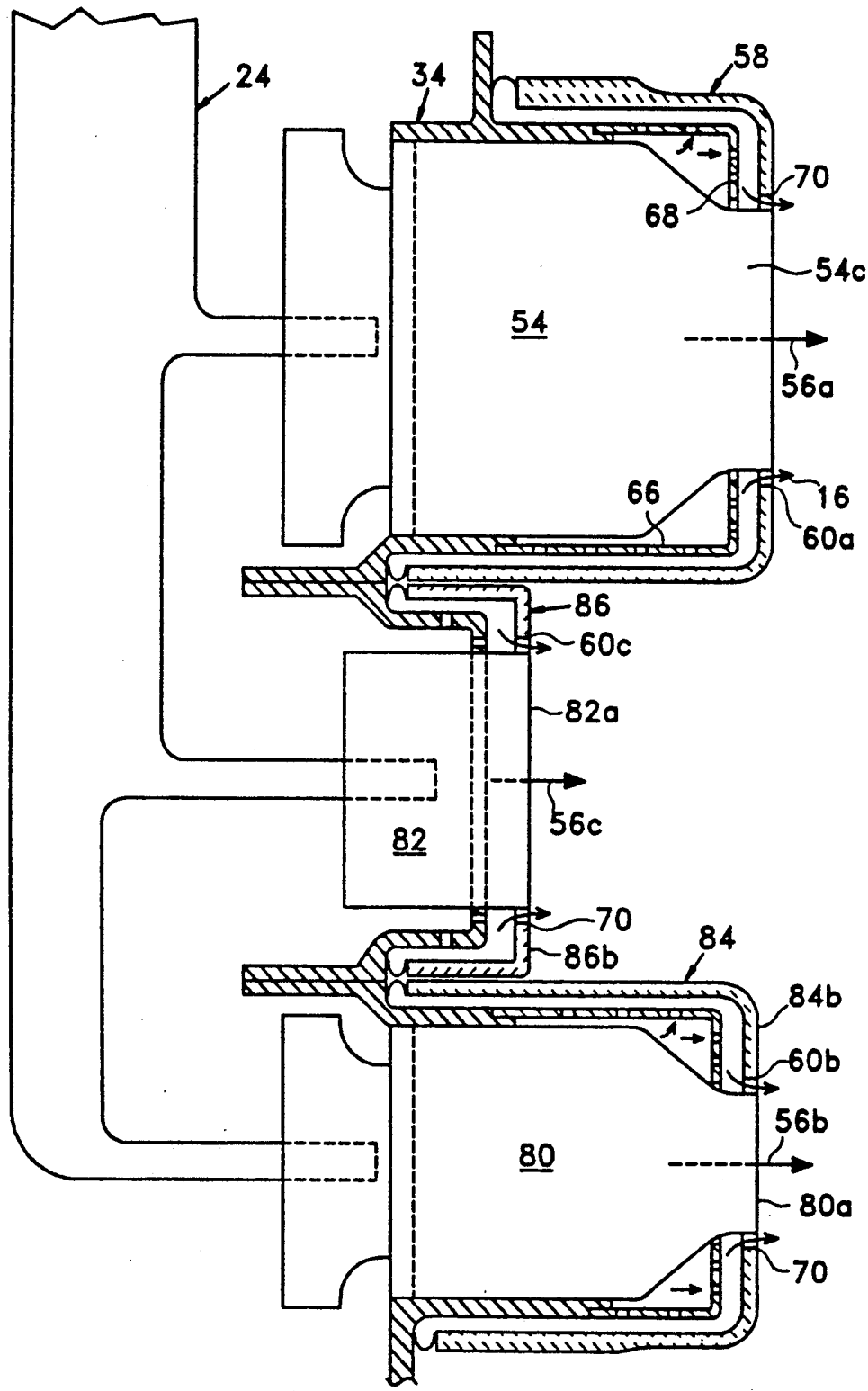
FIG. 6 is a partly sectional view of the dome portion of the combustor illustrated in FIG. 3 taken radially through carburetors therein along line 6—6.
Figure 7:
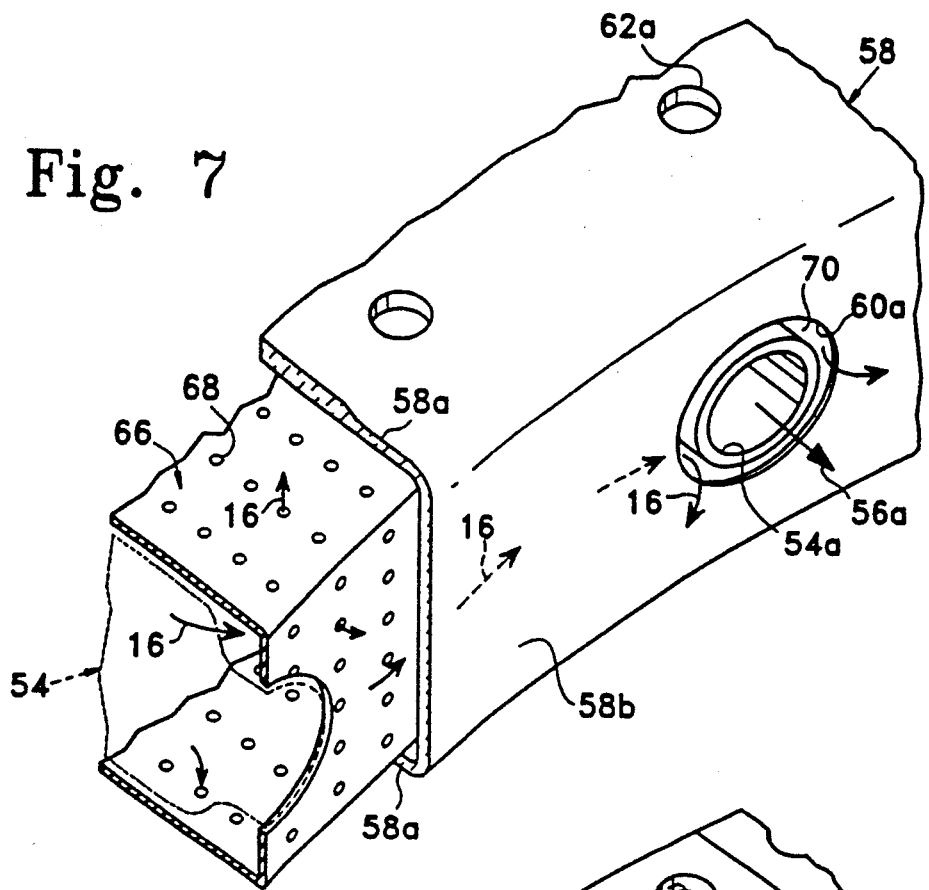
FIG. 7 is a perspective, partly sectional view of an exemplary one of the heat shields and cooperating baffles used in the combustor illustrated in FIGS. 2 and 3 for providing impingement cooling of the heat shield.

More specifically, and referring to FIGS. 5, 6 and 7, the combustor 18 preferably further includes an annular first metallic impingement baffle 66 suitably disposed between the first dome 52 and the first heat shield 58 and predeterminedly spaced therefrom. The first baffle 66 includes an aperture through which extends the mixing can 54c, and a plurality of conventional impingement holes 68 therethrough for injecting a portion of the cooling air 16 in impingement against the first heat shield 58 for impingement cooling the back side thereof. However, the spent impingement air used for cooling the first heat shield 58 is preferably not injected directly into the combustion gases 26 within the combustion zone 40 to prevent an increase in $NO_x$ emissions. More specifically, and in accordance with another object of the present invention, the first ports 60a as shown in FIGS. 3, 4, 6, and 7 are preferably larger in diameter than the first outlets 54a for defining therebetween respective annular gaps 70 for discharging therethrough the spent impingement air firstly used for impingement cooling of the first heat shield 58 concentrically around each outlet 54a for mixing with the first fuel/air mixtures 56a being discharged from the first outlets 54a so that the spent impingement air is also used in the combustion process from the beginning and is not, therefore, reintroduced into the hot combustion gases 26 which would dilute the gases 26 and increase $NO_x$ emissions. As shown in FIG. 5, the first baffle 66 is also generally U-shaped to match the configuration of the first heat shield 58 and provide a substantially uniform spacing therebetween for obtaining effective impingement cooling of the back side of the first heat shield 58.

Also as shown in FIG. 5, at least one of the outer and inner liners 36, 38 includes a plurality of circumferentially spaced apart support holes 72 at upstream ends thereof, and the first pins 64a preferably additionally extend radially through the support holes 72 for mounting both the first heat shield 58 and the outer liner 36 directly to the dome assembly 34 for allowing unrestrained differential thermal movement therebetween while supporting the first heat shield 58 and the outer liner 36 against axial pressure loads thereon. Just as the first mounting pins 64a allow for differential thermal expansion and contraction between the metallic dome assembly 34 and the annular first heat shield 58, they also allow for differential thermal expansion relative to the annular outer liner 36.

Although the combustor 18 illustrated in FIG. 2 could include solely a single dome, such as the first dome 52, in the preferred embodiment illustrated it includes a triple dome having additionally a second annular dome 74 spaced radially inwardly from the first dome 52, and an annular third dome 76 spaced radially between the first and second domes 52 and 74 in the dome assembly 34 as more clearly illustrated in FIG. 5. The first, second, and third domes 52, 74, 76 are suitably integrally joined together and preferably include stiffening struts 78 for providing a structurally rigid dome assembly 34 for withstanding the pressure forces acting across the dome assembly 34 during operation for preventing undesirable distortion or overturning thereof.

As shown in FIG. 5, for example, the second and third domes 74, 76 are preferably configured substantially identically to the first dome 58 although variations thereof are contemplated, with the second dome 74 similarly including a pair of axially extending and radially spaced apart second flanges 74a, and the third dome 76 similarly including a pair of axially extending and radially spaced apart third flanges 76a.

Respective pluralities of circumferentially spaced apart second and third carburetors 80, 82 as shown in FIG. 2 are respectively joined to the second and third domes 74, 76 between the respective second and third flanges 74a, 76a, and are effective for discharging from respective second and third outlets 80a, 82a thereof respective second and third fuel/air mixtures 56b, 56c for collectively generating the combustion gases 26 along with the first fuel/air mixture 54a. In this configuration, the third carburetors 82 provide pilot combustion and the first and second carburetors 54, 80 provide main combustion in a Lean Premixed Prevaporizer (LPP) function with radial swirl.

Referring again to FIG. 2, annular second and third preferably non-metallic heat shields 84, 86 which are similar in structure and function to the first heat shields 58 and also are preferably made from a ceramic matrix composite material are provided for protecting the second and third domes 76, 74 and their carburetors respectively. As best shown in FIG. 5, the second heat shield 84 similarly includes a pair of radially spaced apart and axially extending second legs 84a integrally joined to a radially extending second face 84b in a generally U-shaped configuration. The third heat shield 86 similarly includes a pair of radially spaced apart and axially extending third legs 86a integrally joined to a radially extending third face 86b in a generally U-shaped configuration. In alternate embodiments, the third heat shield 86 may be eliminated and substituted by a conventional thermal barrier coated member or other protective arrangements if desired.

The second and third heat shields 84, 86 are substantially identical to the first heat shield 58 illustrated in FIG. 4, and referring to FIGS. 3 and 6, the second face 84b includes a plurality of circumferentially spaced apart second access ports 60b disposed concentrically with respective ones of the second outlets 80a for allowing the second fuel/air mixture 56b to be discharged from the second carburetors 80 axially through the second heat shield 84. And, similarly, the third face 86b includes a plurality of circumferentially spaced apart third access ports 60c disposed concentrically with respective ones of the third outlets 82a for allowing the third fuel/air mixture 56c to be discharged from the third carburetors 82 axially through the third heat shields 86.

Referring again to FIG. 5, at least one and preferably both of the second legs 84a include a plurality of circumferentially spaced apart and radially extending second mounting holes 62b disposed adjacent to a respective mounting one of the second flanges 74a. And both the third legs 86a include respective pluralities of circumferentially spaced apart, and radially extending third mounting holes 62c disposed adjacent to respective ones of the third flanges 76a. Respective pluralities of circumferentially spaced apart second and third mounting pins 64b, 64c are suitably fixedly joined to the respective second and third flanges 74a, 76a and extend radially through respective ones of the second and third mounting holes 62b, 62c without interference therewith for allowing unrestrained differential thermal movement between the second heat shield 84 and the second dome 74, and between the third heat shield 86 and the third dome 76 while supporting the respective second and third heat shields 84, 86 against axial pressure loads thereon.

As shown in FIG. 5, both the outer and inner liners 36, 38 have respective ones of the support holes 72 at upstream ends thereof, and the first and second pins 64a, 64b, additionally extend radially through the support holes 72 of the outer and inner liners 36, 38, respectively, for mounting both the first heat shield 58 and the outer liner 36 together, and the second heat shield 84 and the inner liner 38 together and to the dome assembly 34. This arrangement allows for differential thermal movement of the non-metallic liners 36, 38 and first and second heat shields 58, 84 relative to the metallic dome assembly 34 while also reacting axial pressure loads through the dome assembly 34. Also as shown in FIG. 5, the bottom of the first heat shield 58 is commonly supported by the top pins 62c of the third dome 76, and the top of the second heat shield 84 is commonly supported by the bottom pins 62c of the third dome 76.

In the preferred embodiment, all three heat shields 58, 84, 86 are predeterminedly spaced radially apart from each other, and from the respective liners 36, 38 to provide gaps therebetween for allowing the combustion gases 26 to more uniformly heat the entire heat shields for reducing thermal stresses therein. Suitable seals are provided between the legs of the heat shields and the domes to seal leakage of spent impingement air 16 therebetween.

In the preferred embodiment illustrated, the first, second, and third heat shields 58, 84, 86 and the outer and inner liners 36, 38 are preferably non-metallic material, and preferably ceramic matrix composites, effective for withstanding heat from the combustion gases 26. Since the first baffle 66 is provided for cooling the first heat shield 58, the combustor 18 preferably also includes annular second and third baffles 88, 90 as shown for example in FIG. 5 which are disposed between the second and third domes 74, 76 and the second and third heat shields 84, 86, respectively, and predeterminedly spaced therefrom. Each of the second and third baffles 88, 90 includes additionally pluralities of impingement holes 68 therethrough for injecting cooling air in impingement against the back sides of the second and third heat shields 84, 86 for impingement cooling thereof.

And, as shown in FIGS. 3 and 6, the second and third ports 60b, 60c are also preferably larger than the second and third outlets 80a, 82a, respectively, for defining therebetween respective additional ones of the annular gaps 70 for discharging therethrough spent impingement air firstly used for impingement cooling of the second and third heat shields 84, 86, respectively.

Figure 8:
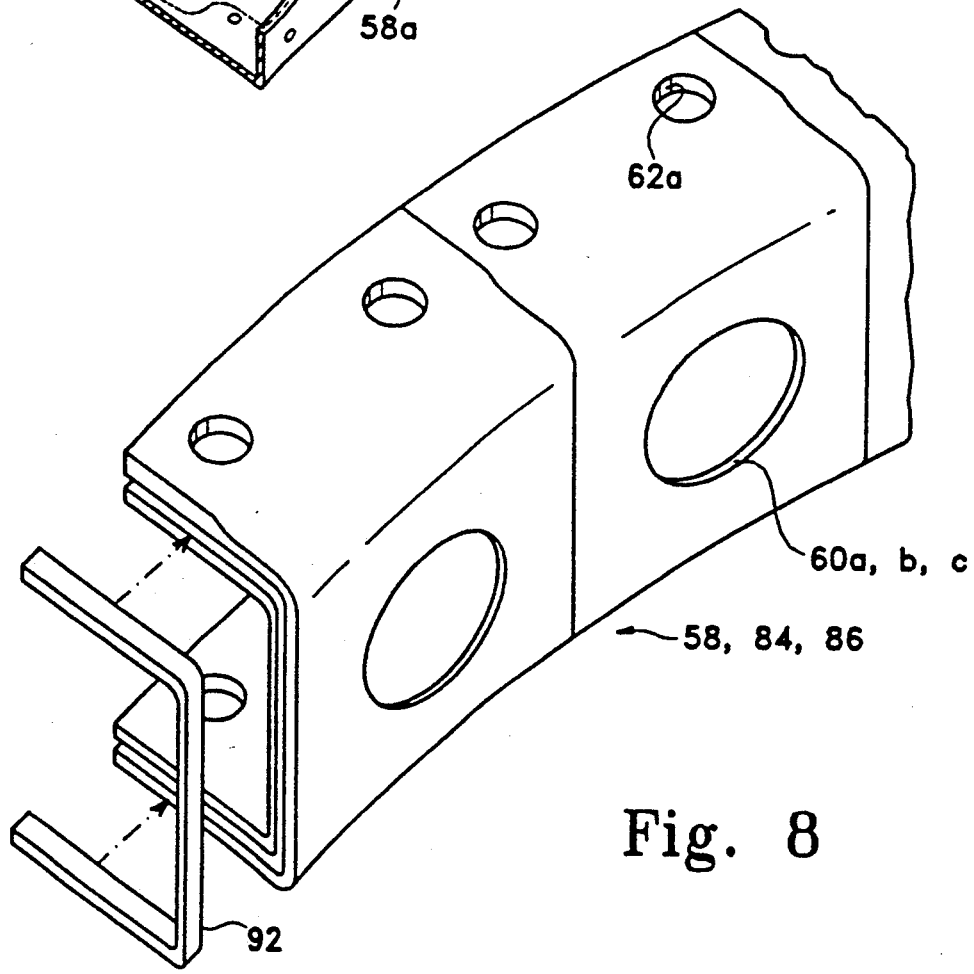
FIG. 8 is an alternate embodiment of an exemplary one of the heat shields formed by a plurality of circumferentially adjoining segments.

As shown in FIGS. 3 and 4, the first, second, and third heat shields 58, 84, 86 are preferably each an integral or unitary annular member respectively supported by the mounting pins 64a,b,c. In an alternate embodiment illustrated in FIG. 8, each of the first, second, and third heat shields 58, 84, 86 may include a plurality of circumferentially adjoining segments as shown collectively forming respective annular members. Each segment may include one ore more of the access ports, e.g. 60a,b,c. Between each of the segments is preferably provided a suitable generally U-shaped seal 92 for reducing leakage of spent impingement air between the adjoining segments which will dilute the combustion gases and increase $NO_x$ emissions therefrom.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A combustor for a gas turbine engine comprising: a longitudinal axis
    an annular dome assembly including at least a first annular dome having a pair of axially extending and radially spaced apart first flanges;
    an annular radially outer liner joined to said dome assembly;
    an annular radially inner liner joined to said dome assembly and spaced radially inwardly from said outer liner to define therebetween an annular combustion zone, downstream ends of said outer and inner liners defining therebetween a combustor outlet;
    a plurality of circumferentially spaced apart first carburetors joined to said first dome between said first flanges and effective for discharging from a first outlet thereof a first fuel/air mixture for generating combustion gases in said combustion zone and dischargeable from said combustor outlet;
    an annular first heat shield having a pair of radially spaced apart and axially extending first legs integrally joined to a radially extending first face in a generally U-shaped configuration, said first face including a plurality of circumferentially spaced apart first ports disposed concentrically with respective ones of said first outlets for allowing said first fuel/air mixture to be discharged from said first carburetors axially through said first heat shield, and at least one of said first legs including a plurality of circumferentially spaced apart and radially extending first mounting holes disposed adjacent to a respective mounting one of said first flanges; and
    a plurality of first mounting pins fixedly joined to said mounting first flange and extending radially through respective ones of said first mounting holes without interference therewith for allowing unrestrained thermal movement between said first heat shield and said first dome while supporting said first heat shield against axial pressure loads thereon.

2. A combustor according to claim 1 wherein said first heat shield is imperforate between said first mounting holes and said first ports.

3. A combustor according to claim 2 wherein said first heat shield has a coefficient of thermal expansion less than a coefficient of thermal expansion of said dome assembly.

4. A combustor according to claim 3 further comprising:
    an annular first baffle disposed between said first dome and said first heat shield and predeterminedly spaced therefrom, and including a plurality of impingement holes therethrough for injecting cooling air in impingement against said first heat shield for impingement cooling thereof; and
    said first ports being larger than said first outlets for defining therebetween respective annular gaps for discharging therethrough spent impingement air firstly used for impingement cooling of said first heat shield.

5. A combustor according to claim 4 wherein at least one of said outer and inner liners has a plurality of circumferentially spaced apart support holes at an upstream end thereof, and said first pins additionally extend radially through said support holes, respectively, for mounting both said first heat shield and said one liner to said dome assembly for allowing unrestrained differential thermal movement therebetween while supporting said first heat shield and said one liner against axial pressure loads thereon.

6. A combustor according to claim 5 further comprising:

an annular second dome spaced radially from said first dome in said dome assembly and having a pair of axially extending and radially spaced apart second flanges;

a plurality of circumferentially spaced apart second carburetors joined to said second dome between said second flanges and effective for discharging from a second outlet thereof a second fuel/air mixture for generating said combustion gases;

an annular second heat shield having a pair of radially spaced apart and axially extending second legs integrally joined to a radially extending second face in a generally U-shaped configuration, said second face including a plurality of circumferentially spaced apart second ports disposed concentrically with respective ones of said second outlets for allowing said second fuel/air mixture to be discharged from said second carburetors axially through said second heat shield, and at least one of said second legs including a plurality of circumferentially spaced apart and radially extending second mounting holes disposed adjacent to a respective mounting one of said second flanges; and a plurality of circumferentially spaced apart second mounting pins fixedly joined to said mounting second flange and extending radially through respective ones of said second mounting holes without interference therewith for allowing unrestrained differential thermal movement between second heat shield and said second dome while supporting said second heat shield against axial pressure loads thereon.

7. A combustor according to claim 6 wherein both of said outer and inner liners have respective ones of said support holes at upstream ends thereof, and said first and second pins additionally extend radially through said support holes of said outer and inner liners, respectively, for mounting both said first heat shield and said outer liner together, and said second heat shield and said inner liner together to said dome assembly.

8. A combustor according to claim 7 further comprising:

an annular third dome spaced radially between said first and second domes in said dome assembly and having a pair of axially extending and radially spaced apart third flanges;

a plurality of circumferentially spaced apart third carburetors joined to said third dome between said third flanges and effective for discharging from a third outlet thereof a third fuel/air mixture for generating said combustion gases;

an annular third heat shield having a plurality of radially spaced apart and axially extending third legs integrally joined to a radially extending third face in a generally U-shaped configuration, said third face including a plurality of circumferentially spaced apart third ports disposed concentrically with respective ones of said third outlets for allowing said third fuel/air mixture to be discharged from said third carburetors axially through said third heat shield, and both said third legs including respective pluralities of circumferentially spaced apart and radially extending third mounting holes disposed adjacent to respective ones of said third flanges; and respective pluralities of circumferentially spaced apart third mounting pins fixedly joined to said third flanges and extending radially through respective ones of said third mounting holes without interference therewith for allowing unrestrained differential thermal movement between said third heat shield and said third dome while supporting said third heat shield against axial pressure loads thereon.

9. A combustor according to claim 8 further comprising:

annular second and third baffles disposed between said second and third dome and said second and third heat shields, respectively, and predeterminedly spaced therefrom, and said annular second and third baffles each including a plurality of impingement holes therethrough for injecting cooling air in impingement against said second and third heat shields for impingement cooling thereof; and said second and third ports being larger than said second and third outlets, respectively, for defining therebetween respective annular gaps for discharging therethrough spent impingement air firstly used for impingement cooling of said second and third heat shields, respectively.

10. A combustor according to claim 9 wherein said first, second, and third heat shields and said outer and inner liners are non-metallic material effective for withstanding heat from said combustion gases.

11. A combustor according to claim 10 wherein said first, second, and third heat shields and said outer and inner liners are ceramic matrix composites.

12. A combustor according to claim 11 wherein each of said first, second, and third heat shields is an integral annular member.

13. A combustor according to claim 11 wherein each of said first, second, and third heat shields includes a plurality of circumferentially adjoining segments collectively forming an annular member.

* * * * *